United States Patent Office 3,770,645
Patented Nov. 6, 1973

3,770,645
HARDENER COMPOSITION FOR
URETHANE RESIN
Satoru Enomoto and Hisayuki Wada, Iwaki, and Mikio Fujioka and Masao Koguro, Tokyo, Japan, assignors to Kureha Kagaku Kogyo Kabushiki Kaisha, Tokyo, Japan
No Drawing. Filed Sept. 14, 1971, Ser. No. 180,476
Claims priority, application Japan, Sept. 14, 1970, 45/80,757
Int. Cl. C07c 125/04; C08k 1/82
U.S. Cl. 252—182   5 Claims

ABSTRACT OF THE DISCLOSURE

This invention is a hardener composition for use with urethane resin which is odorless; exhibits superior weatherfastness and workability; is manufactured inexpensively; and which is substantially free of poisonous properties.

BACKGROUND OF THE INVENTION

(1) Prior art

This invention relates to a superior hardener composition for use with urethane resin and providing superior workability and performance.

Among others, 4,4'-methylene-bis - 2-chloroaniline (hereinafter referred to as MOCA throughout the present specification) having the following formula:

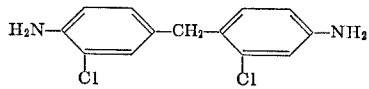

is used most predominantly for the above service. The hardening agent has superior performances for that purpose. However, it has a melting point of 106° C., and is thus highly difficult to handle. It is, therefore, a sincere desire of those skilled in the art, to provide an improved hardener having the superior solvent nature and performances as MOCA, yet being highly convenient in handling.

(2) Objects of the invention

It is the main object of the invention to provide an extender for use with urethane resin capable of satisfying substantially the above desire and representing superior weatherfastness, the least possible poisonous properties, odorlessness, which is colorless and which is cheap in its manufacturing cost.

Other objects of this invention will be apparent to those skilled in the art as the description of this invention proceeds.

DESCRIPTION OF THE INVENTION

In order to satisfy the above object, the composition according to this invention comprises 20–1500 wt. parts of a propylated polycyclic aromatic hydrocarbon, having a boiling point of 300–450° C., a Gardner color index less than 10, a viscosity less than 10,000 cps. at 25° C., a concentration of aromatic proton as measured by the nuclear magnetic resonance absorption method of 15–80%, and a mean number of substituted propyl groups per molecule of 1–4, or a partially hydrogenated hydrocarbon of the above kind, and about 100 wt. parts of 4,4'-methylene-bis-2-chloroaniline.

The composition is of liquid to paste-like state, representing no appreciable deterioration even upon storage for a long period. When the hardener composition is used in combination with urethane resin, the hardened substance represents superior physical properties comparative to those of MOCA. In addition, known defects of urethane resin, such as inferior water-proofness and weatherfastness can be highly improved. The products can be used in such industrial fields where heretofore coal tar and coal pitch have been used.

As was referred to hereinbefore, propylated polycyclic aromatic compounds usable as the main component of the composition according to the invention have boiling points ranging from 300 to 450° C., less than 5% weight loss on heating as measured under the testing specification JIS-K-5400 prescribed in Japanese Industrial Standards, a Gardner color index of less than 10, and a viscosity less than 10,000 cps. at 25° C. These compounds are propylated polycyclic aromatics having 2–5 rings of an aromatic proton concentration of 15–80% as measured by the high-resolving NMR. The aromatic proton concentration can be calculated by the following Formula 1:

$$\text{Aromatic proton concentration} = \frac{H_a}{H_t} \times 100\% \quad (1)$$

where, $H_t$ is the total proton strength as measured by NMR-measurement.

$H_a$ is the total proton concentration for the range of $\tau$(tau)-value of 1.5–4 p.p.m. and taking the position of trimethyl silane as 10.

The number of propyl groups per mean molecular weight ranges from 1 to 4.

The characteristics owned by the propylated polycyclic aromatic compounds usable in the present invention have high mutual solubilities to both urethane resin and MOCA, thereby providing a high grade of workability and representing substantially no disadvantageous property to the compounded products. In addition, the color tone is rather white and there is substantially no appreciable limitation of coloring and no occurrence of harmful and unhealthy odor, as may frequently be found with urethane/tar resins. In addition, superior water tightness is given to the compounded products which are cheaper in their manufacturing cost than conventional urethane resins.

In order to prepare the propylated polycyclic aromatic compounds as usable in the present invention, the origin of the starting material can be found, for instance, in the ethylene bottom oil which may be obtained as the residual from the ethylene or acetylene manufacturing plant wherein petroleum hydrocarbons such as crude petroleum oil, heavy oil, light oil and/or kerosene, naphtha, LPG and/or the like are thermally decomposed at 700–1, 500° C., for a highly short period such as 5–0.001 second(s); oil tar and the like by-products produced in the high temperature gasification of heavy oil or crude petroleum oil, and/or various residual oils rich in aromatic compounds and as obtained from the dealkylation process at high temperatures. The starting material is, as a first stage, subjected to hydrotreatment by contact with gaseous hydrogen, and then, as a second stage, to propylation by contact with propylene, to the desired compound.

The purpose of the said first stage is to remove sulfur, nitrogenous, and metal components which are liable to reduce or otherwise possibly adversely effect the catalyzing function of the catalyst employed in the second stage, as well as, to stabilize the reaction by saturation of the olefinic double bonds obtained by the result of the said thermal decomposition. The first stage may be carried into effect in one or two steps. Under proper conditions, one or two rings contained in the polycyclic aromatic rings may be saturated. However, such saturation provides no appreciable adverse effect so far as the thus modified products have specific physical properties as proposed by the invention.

The employable reaction conditions are:

| | |
|---|---|
| Temp. | 40–450° C. |
| Pressure | 5–300 kg./cm.² |
| Hydrogen moles/mean moles of the starting material | 3–15. |
| LHSV, cc./cc./hr. (space speed of liquid) | 0.2–10. |
| Catalyst | Tungsten, cobalt, molybdenum, nickel or its mixture are used in sulfide, pure metal and/or oxide, being supported on conventional carriers such as alumina, diatomaceous earth (kieselguhr) or the like. |

It will be seen that these reaction conditions are similar to those which are conventionally employed in the petroleum refinery industry.

In the second stage for carrying out the propylation, the purpose is such that by the propylation, the reaction products are converted to those having higher boiling point and thus a lower viscosity. In addition, the heat resistant performance and the stabilization degree against oxydation can be highly improved by said alkylation.

With less than unity of the number of propyl groups per mean molecular weight, the aforementioned advantageous characteristics could not be obtained. With more numerous propyl groups than 4, the alkylation can only be realized under highly difficult conditions and is thus too uneconomical to be adopted. The reaction conditions for the second stage are such as enumerated hereinbelow which are similar to those commonly employed in the conventional alkylation process.

| | |
|---|---|
| Temp. | 40–380° C. |
| Pres., kg./cm.² | From the normal to 150. |
| LHSV | 0.2–10. |
| Ratio in moles of propylene/mean moles of starting material | 0.2–10. |
| Catalyst | Solid acid catalyst, such as silica/alumina; silica/magnesia; zeolite; solid phosphoric acid or phosphates or the like. |

The thus obtained propylated oil is refiningly distilled to within the boiling range of 300–450° C., when convertingly based upon the normal pressure. In this way, the compounds functioning as the additive according to the present invention can be obtained.

The additive thus obtained can be added in the range of 20–1,500 wt. parts relative to 100 wt. parts of MOCA.

Use of less than 20 wt. parts will result only in a minor advantage from the point of cost reduction. Use of higher amounts than 1,500 wt. parts may result in the invitation of an adverse effect upon the properties of the urethane resin.

The usable range of urethane resins is practically non-limiting. In considering the use of MOCA, the composition may be used rather advantageously in the form of sealants, waterproofing agents, seamless floor materials, paints and/or the like with highly advantageous merits over the use of foam products.

The composition according to this invention can be used in combination with conventional coloring agents and/or fillers, and may be modified or adjusted by the use of conventional additives such as solvents or the like.

MANUFACTURING EXAMPLE 1

Tarry substance obtained as by-products from the process for the manufacture of acetylene and ethylene by introducing Seria crude oil into superheated steam at 2,000° C., and heat-treating it at 1,350° C., for 0.003 second, was hydrotreated and propylated under the conditions as enlisted in the following Table I, and the reaction mixture was refiningly distilled to produce a propylated polycyclic aromatic hydrocarbon A according to this invention.

TABLE I

| Catalyst | Temp., ° C. | Press., kg./cm.² | Hydrogen molecular ratio | Propylene, molecular ratio | LHSV |
|---|---|---|---|---|---|
| (Hydrotreatment) cobalt-molybdenum/Alumina | 350 | 35 | 5 | | 0.5 |
| (Alkylation) silica/alumina | 200 | 20 | | 3.0 | 0.5 |

The properties of the thus obtained hydrocarbon A are as follows:

TABLE II

| | |
|---|---|
| Boiling points, ° C. | 350–420 |
| Viscosity, cps. (25° C.) | 1,250 |
| Evaporative components, percent (110° C., 3 hrs.) | 0.4 |
| Concentration of aromatic protons, percent | 59.8 |
| Number of propyl groups per mean molecular weight | 2.0 |
| Gardner color index | 6 |

MAUNFACTURING EXAMPLE 2

So-called ethylene bottom oil which had been obtained in the manufacturing process of ethylene by thermal decomposition of naphtha of Middle East Asia origin through the outer heating process, was hydrotreated and propylated by propylene and under the treating conditions as enlisted in the following Table III. Then, the reaction mixture was refiningly distilled so as to produce a propylated polycyclic aromatic hydrocarbon B according to this invention.

TABLE III

| Catalyst | Temp., ° C. | Press., kg./cm.² | Hydrogen molecular ratio | Propylene, molecular ratio | LHSV |
|---|---|---|---|---|---|
| (Hydrotreatment (1)) NiS/alumina | 80 | 40 | 5 | | 0.5 |
| (Hydrotreatment (2)) cobalt-molibdenum/alumina | 380 | 40 | 5 | | 0.5 |
| (Propylation) silica/alumina | 200 | 20 | | 3 | 0.5 |

The thus obtained substance showed the following properties.

TABLE IV

| | |
|---|---|
| Boiling point, ° C. | 330–450 |
| Viscosity, cps. (25° C.) | 1,040 |
| Evaporative components, percent (110° C., 3 hrs.) | 0.4 |
| Concentration of aromatic protons (NMR), percent | 78.0 |
| Number of propyl groups per mean molecular weight | 1.6 |
| Gardner color index | 5 |

Example 1

Proplyated polycyclic aromatic hydrocarbons A and B which had been prepared from the Manufacturing Examples 1 and 2 were added successively at a ratio of 1:1 with various hardening agents such as isocyanates, isocyanate prepolymers, amines, modified hardened oils and various polyols, so as to investigate their mutual solubility. As shown in the following Table V, these substances A and B showed complete mutual solubility with them.

TABLE V

| | NCO, percent | A | B |
|---|---|---|---|
| (1) Isocyanates and prepolymers: | | | |
| (a) Isocyanate: | | | |
| Toluene diisocyanate (T.D.I.) | | C.C. | C.C. |
| Diphenylmethane-4,4'-diisocyanate | | S | S |
| Naphthalene-1,5-diisocyanate | | C.C. | C.C. |
| (b) Prepolymer: | | | |
| XL-1011 (manufactured by Takeda Pharmaceutical Co., Osaka) | 3.3 | C.C. | C.C. |
| XL-1017 (manufactured by Takeda Pharmaceutical Co., Osaka) | 3.3 | C.C. | C.C. |
| XL-1025 (manufactured by Takeda Pharmaceutical Co., Osaka) | 3.5 | C.C. | C.C. |
| TP-309 (manufactured by Hitachi Reichfold) | 3.5 | C.C. | C.C. |
| TP-352 (manufactured by Hitachi Reichfold) | 3.5 | C.C. | C.C. |
| TP-318 (manufactured by Hitachi Reichfold) | 3.0 | C.C. | C.C. |
| SA-350 (manufactured by Hodogaya Kagaku Kogyo K.K., Hodogaya) | 3.0 | C.C. | C.C. |
| SA-400 (manufactured by Hodogaya Kagaky Kogyo K.K., Hodogaya) | 3.5 | C.C. | C.C. |
| SA-501 (manufactured by Hodogaya Kagaku Kogyo K.K., Hodogaya) | 3.4 | C.C. | C.C. |
| Polyflex-MT (manufactured by Dai ichi Kogyo Seiyaku K.K.) | 3.2 | C.C. | C.C. |
| Sanpren-SEL-3 (manufactured by Sanyo Kasei KK.) | 3.6 | C.C. | C.C. |
| UEX-504-SS (manufactured by Nippon Elastomer K.K.) | 6.0 | C.C. | C.C. |
| Adiprene L-100 (Du Pont) | 6.4 | C.C. | C.C. |
| (2) Hardeners: | | | |
| (a) Amine: | | | |
| 4,4-diaminodiphenylmethane | | C.C. | C.C. |
| 4,4-methylene-bis-(2-chloroaniline), MOCA | | C.C. | C.C. |
| (b) Modified hardener: | | | |
| Olester-C-1000 (manufactured by Mitsui-Toatsu Kogyo K.K.) | | C.C. | C.C. |
| Olester-C-1066 (manufactured by Mitsui-Toatsu Kogyo K.K.) | | C.C. | C.C. |
| (c) Polyester type polyol: | | | |
| Desmophen 800 (Bayer A.G.) | | P.S. | P.S. |
| Desmophen 1200 (Bayer A.G.) | | S. | S. |
| Desmophen 1700 (Bayer A.G.) | | S. | S. |
| (d) Polyether type polyol: | | | |
| ADK-p-400 (manufactured by Asahi Denka Kogyo K.K.) | | C.C. | C.C. |
| ADK-p-2000 (manufactured by Asahi Denka Kogyo K.K.) | | C.C. | C.C. |
| ADK-T-300 (manufactured by Asahi Denka Kogyo K.K.) | | C.C. | C.C. |
| ADK-T-700 (manufactured by Asahi Denka Kogyo K.K.) | | C.C. | C.C. |

NOTE.—Symbol "C.C." means full mutual solubility; "P.S." means full mutual solubility and partial solution; "S." means complete solution.

EXAMPLE 2

Propylated polycyclic aromatic hydrocarbon A obtained from the Manufacturing Example 1 were admixed in various ratios with 12.5 parts of MOCA, and then with 100 parts of polyurethane prepolymer (Adiprene-L-100) at 100° C., and cured by heating at 100° C., for 2 hours to provide an elastomer. This elastomer was tested in accordance with the testing specification prescribed under JIS–K6301 (Japanese Industrial Standards). The results were shown in the following Table VI.

For comparison, dibutyl phthalate (DBP), xylene-formalin resin (Nicanol) and coal tar (SS-tar for urethane use, manufactured by Osaka Yuki K.K., Osaka) were used. With the first two, the resulted properties were highly disadvantageous. With use of the coal tar, the products were black elastomers and unable to be colored as desired.

Next, the substances enlisted in the foregoing Table VI were immersed into a pure water bath at 70° C., for 24 hours to test their water-proofness.

The results are listed in the following Table VII.

As clearly seen from Table VII, the composition proposed by the present invention provides superiorly improved water-proofness of the elastomer.

It has been further demonstrated that with no change of the material urethane polymer, the hardness of the hard substances can be regulated as desired which means a remarkable progress in the art.

TABLE VI

| Adiprene L, parts | MOCA, parts | "A" parts | MOCA/"A" | Tensile strength, kg./cm.² | Tearing strength, kg./cm. | Elongation, percent | Hardness, JIS, A-type | Bleed |
|---|---|---|---|---|---|---|---|---|
| 100 | 12.5 | 0 | 0 | 353 | 63 | 930 | 91 | None. |
| 100 | 12.5 | 3.1 | 1/0.25 | 355 | 64 | 935 | 90 | Do. |
| 100 | 12.5 | 12.5 | 1/1 | 310 | 60 | 1,090 | 87 | Do. |
| 100 | 12.5 | 25 | 1/2 | 273 | 56 | 1,150 | 83 | Do. |
| 100 | 12.5 | 50 | 1/4 | 200 | 45 | 1,340 | 77 | Do. |
| 100 | 12.5 | 100 | 1/8 | 141 | 37 | 1,310 | 67 | Do. |
| 100 | 12.5 | 150 | 1/12 | 112 | 29 | 1,250 | 57 | Do. |
| 100 | 12.5 | 150 | 1/12 | 112 | 29 | 1,250 | 57 | Do. |
| 100 | 12.5 | DBP 100 | | 112 | 27 | 1,350 | 65 | Do. |
| 100 | 12.5 | Nicanol 100 | | 16 | 8 | 121 | 11 | Do. |
| 100 | 12.5 | Coal tar 100 | | 138 | 35 | 1,300 | 65 | Do. |

TABLE VII

| Adiprene L, parts | MOCA, parts | "A" parts | MOCA/"A" | Tensile strength, kg./cm.² | Tearing strength, kg./cm. | Elongation, percent | Hardness, JIS, A-type | Bleed |
|---|---|---|---|---|---|---|---|---|
| 100 | 12.5 | | | 326 | 58 | 860 | 91 | None. |
| 100 | 12.5 | 125 | 1/1 | 300 | 58 | 1,050 | 87 | Do. |
| 100 | 12.5 | 25 | 1/2 | 270 | 54 | 1,100 | 83 | Do. |
| 100 | 12.5 | 50 | 1/4 | 200 | 43 | 1,290 | 76 | Do. |
| 100 | 12.5 | 100 | 1/8 | 138 | 37 | 1,220 | 64 | Do. |
| 100 | 12.5 | Coal tar 100 | | 128 | 34 | 1,200 | 62 | Do. |

EXAMPLE 3

Propylated polycyclic aromatic hydrocarbon B according to the present invention was admixed with 100 wt. parts of urethane prepolymer "XL-1025" (manufactured by Takeda Pharmaceutical Co. Ltd., Osaka); 9 wt. parts of MOCA and 50 wt. parts of calcium carbonate and the mixture was left alone for a week to harden. In this way, a sealant type urethane polymer was obtained.

Several physical properties, test results on thermal resistance, water-proofness and anti-chemical property of the composition are shown in the following Table VIII.

TABLE VIII

| | Tensile strength, kg./cm.$^2$ | Tensile elongation, percent | Tearing strength, kg./cm. | Hardness |
|---|---|---|---|---|
| Test material | 70.4 | 710 | 21.3 | 74 |
| 100° C., air bath, one week test | 80.4 | 710 | 24.7 | 76 |
| Fresh water, immersion for one week | 69.3 | 700 | 20.6 | 73 |
| 5%-salt water, immersion for one week | 67.9 | 740 | 19.9 | 72 |
| 5%-caustic soda solution immersion for one week | 66.2 | 710 | 19.9 | 70 |
| 20%-sulfuric acid solution, immersion for one week | 70.5 | 730 | 20.5 | 74 |

As clearly demonstrated from the foregoing Table VIII, the sealant made of the composition represents a superior performance.

It is claimed:

1. A hardener composition for use with a urethane resin, which comprises from 20 to 1500 parts by weight of a propylated polycyclic aromatic hydrocarbon, which exhibits a boiling point of from 300–450° C., a Gardner color index of less than 10, a viscosity of less than 10,000 cps. at 25° C., a concentration of aromatic proton as measured by the nuclear magnetic resonance absorption method of from 15–80%, and the mean number of substituted propyl groups per molecule being within a range of from 1 to 4, or a partially hydrogenated hydrocarbon of the above-identified kind, and 100 parts by weight of 4,4'-methylene-bis-2-chloroaniline, said propylated polycyclic aromatic hydrocarbon being prepared by a process which comprises:

(1) subjecting a member selected from the group consisting of ethylene bottom oil and oil tar to hydrotreating with gaseous hydrogen, and (2) subsequently subjecting said hydrotreated ethylene bottom oil or oil tar to propylation by contacting the same with propylene, said hydrotreatment step being carried out in the presence of a suitable catalyst and at a temperature ranging from 40 to 450° C.; a pressure ranging from 5 to 300 kc./cm.$^2$; a hydrogen concentration ranging from 3 to 15 mols; and a LHSV value ranging from 0.2 to 10.0; and said propylation step being carried out in the presence of a suitable catalyst and at a temperature ranging from 40 to 380° C.; a pressure ranging from normal to 150 kc./cm.$^2$; a propylene concentration ranging from 0.2 to 10.0 mols; and a LHSV value ranging from 0.2 to 10.0.

2. The composition of claim 1, wherein the catalyst employed during said hydrotreating step is a member selected from the group consisting of tungsten, cobalt, molybdenum, and nickel, their sulfides, or their oxides.

3. The composition of claim 2, wherein said catalyst is contained on a conventional catalytic support.

4. The composition of claim 3, wherein said support is a member selected from the group consisting of alumina and diatomaceous earth.

5. The composition of claim 1, wherein the catalyst employed during said propylation step is a solid acid catalyst selected from the group consisting of silica-alumina, silica/magnesia, a zeolite, solid phosphoric acid, and a solid phosphate.

References Cited

UNITED STATES PATENTS

| | | | |
|---|---|---|---|
| 3,338,861 | 8/1967 | Mastin et al. | 260—33.6 UB |
| 3,390,119 | 6/1968 | Alexander et al. | 260—18 TN |

OTHER REFERENCES

Sinclair Petrochemicals Product Data Bulletin No. 505, May 1, 1965, pp. 6, 7, 10, 35, 36, 37.

LEON D. ROSDOL, Primary Examiner

I. GLUCK, Assistant Examiner

U.S. Cl. X.R.

260—2.5 A, 33.6 UB, 77.5 AM